July 2, 1968   E. BECKER ET AL   3,390,746
ELECTRIC DRIVE UNIT
Filed March 18, 1966
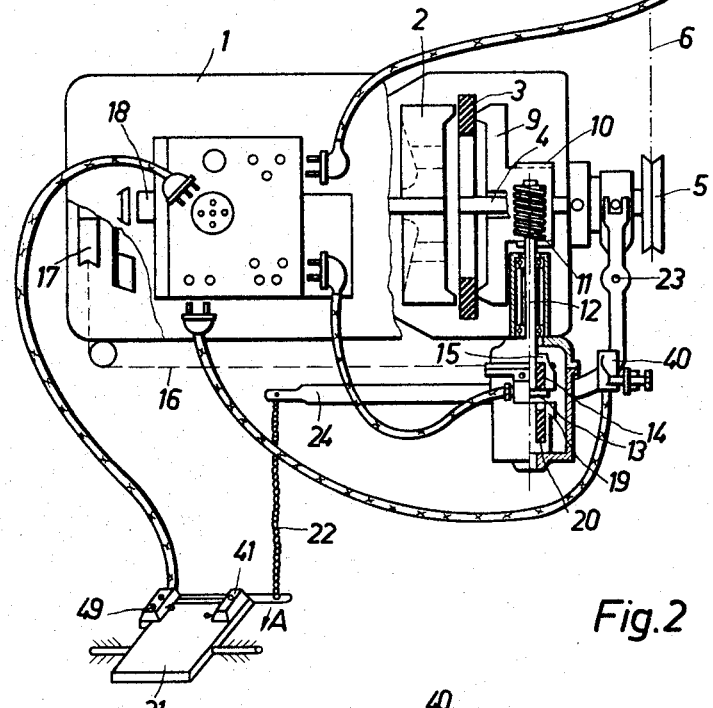
Inventors
ERNST BECKER
KARL NOTZ
ATTORNEYS

United States Patent Office 3,390,746
Patented July 2, 1968

3,390,746
ELECTRIC DRIVE UNIT
Ernst Becker, 85 Grafenhauser Strasse, Darmstadt 61, Germany, and Karl Notz, 7 Kressenstein, Kulmbach, Upper Franconia 865, Germany
Filed Mar. 18, 1966, Ser. No. 535,514
Claims priority, application Germany, Mar. 23, 1965, Q 823
2 Claims. (Cl. 192—18)

ABSTRACT OF THE DISCLOSURE

A drive unit with provision for stopping the drive in a precalculated angular position. The unit includes a motor which drives an output shaft through an electro-magnetic clutch. A disc and worm wheel are mounted together to rotate about the output shaft and can be engaged by energizing the clutch. The worm driving the worm wheel is driven by a shaft which is connected to a further clutch to bring the shaft into and out of engagement with a secondary drive by alternately energizable electro-magnets mounted on either side. This secondary drive is of lower speed than the motor. A lever mechanism is provided to move the electro-magnetic clutch into and out of engagement with a drive plate of the motor. An electronic circuit is provided, which when the drive is to be stopped de-energizes the clutch and energizes the appropriate electro-magnet to bring the secondary drive into operation. At the same time, the electro-magnetic clutch is shifted and re-energized to couple the secondary drive to the output shaft. The electronic circuit includes a transistor switching circuit, and the tuning of its operation is derived from a slip ring interrupter having a number of slip rings with interruption at various positions. The position in which the drive is to be stopped is determined by connecting an appropriate one of the slip rings into the circuit by means of a selector switch.

---

The technical purpose underlying the present invention is to provide an electric drive which is capable of stopping a processing machine driven thereby from a high number of revolutions, for example, 6,000 revolutions per minute, nearly instantaneously, at a preselectable angular stopping position of the driven processing machine shaft, whereby the stopping position arising upon shut-down can deviate by an angle of about one degree from the preselected stopping position.

To achieve this purpose, the invention starts from an electromotive drive having a high-speed main drive and a low-speed auxiliary drive and having a clutch disc, which stands in drive connection with the processing machine that is to be driven and which can be coupled up optionally with the main drive or the auxiliary drive, whose component cooperating with the clutch disc can be connected to the source of torque via an electric additional clutch magnet or can be connected to a brake via an electric brake magnet, whereby a capacitor gauges the rate of revolutions at which a slip-ring interrupter, rotating in synchronism with the driven processing machine shaft, switches the additional clutch magnet off in the predetermined angular position, whereupon the brake magnet is switched in.

With a known drive of this kind, the high-speed shaft of the processing machine comes to a stop in a comparatively short time after the arresting procedure has been initiated, namely within an angular range which lies well below 10°. This stopping accuracy is quite good, but frequently an even better stopping accuracy is required.

According to the present invention there is provided an electromotive drive that can be stopped in a precalculated angular position, having a high-speed main drive and a low speed auxiliary drive and having a clutch disc, which is provided with a drive take-off so as to be able to be placed in drive connection with a processing machine shaft to be driven and can be coupled up optionally with the main drive or the auxiliary drive, whose component cooperating with the clutch disc can be connected to the source of torque via an electric additional clutch magnet or can be connected to a brake via an electric brake magnet, a capacitor arranged to gauge the rate of revolutions at which a slip-ring interrupter, connected to rotate in synchronism with the drive take-off and so connected as to switch the additional clutch magnet off in some predetermined angular position relative to the drive take-off, whereupon the brake magnet is switched in, characterised in that a transistor circuit having two transistors, the first of which is associated with the electric additional clutch magnet to supply power thereto and the second of which is associated with the brake magnet to supply power thereto, is connected in such a way that, when the circuit has voltage applied to it by a switch, the first transistor is switched in and the second transistor is switched out, in such a way that, when the switch is opened, the transistors to begin with maintain their switch state until, when some precalculated cut-off r.p.m. is reached, the first transistor blocks and the second transistor opens.

This latter is achieved by the invention in an extremely short stoppage time. Accordingly, in an electromotive drive of the type indicated according to the invention, there is provided a transistor circuit having two transistors, the first of which is associated with the electric additional clutch magnet and the second of which is associated with the brake magnet, connected in such a way that, when this circuit has voltage applied to it by a switch, the first transistor conducts and the second transistor blocks and, when the switch is opened, the transistors to begin with maintain their switched state until, when the precalculated cut-off r.p.m. is reached, the first transistor blocks and the second transistor conducts.

When, upon the clutch disc being released from the main drive, the power supply of the additional clutch magnet is controlled by the slip-ring interrupter in conjunction with the capacitor via the first transistor, then, the discharging current of the capacitor will cause the first transistor to remain conductive during the respective interruption of the control current by the slip-ring interrupter. When the rate of revolutions of the processing machine has fallen to the value at which the switching off is to ensue, then the discharging current of the capacitor is no longer sufficient to keep the first transistor conductive during the time when the control circuit is interrupted by the slip-ring interrupter. Consequently, this transistor immediately blocks, so that the additional clutch magnet coil is de-energised. In this way, after blocking of the first transistor has taken place, this latter cannot again become conductive when the insulating point of the synchroniser (the slip-ring interrupter) breaks contact with the brush, a further transistor is connected in series to the synchroniser. This third transistor is conductive if the first transistor is also conductive. It is blocked as soon as the second transistor becomes conductive.

Furthermore, a throw-over switch is present which, by its throwing when the first transistor is blocked causes the third transistor to conduct by means of the discharging current of a capacitor provided expressly for this purpose, so that the first transistor that has already become blocked then again becomes conductive. In this way, it is possible to alter the angular stopping position even after the pedal has been released.

So that the energy present in the magnet coil is quickly dissipated, in accordance with a further feature of the invention, a rectifier acting as a by-pass anode is connected in parallel with the additional clutch magnet. A similar rectifier is connected in parallel with the brake magnet. Whilst the first transistor is blocked, the control voltage of the second transistor is automatically increased, because the voltage dip through the working current in the coil of the additional clutch magnet ceases. Conditional upon the increase in the control voltage at the second transistor, this latter becomes conductive, so that the brake magnet is energised. Consequently, the component co-operating with the clutch disc is finally braked.

Because the switching-in time of the transistors is in the order of a few microseconds, that because even for the release of the switching pulse by the capacitor, times in the order of microseconds at the most are required, the additional clutch magnet coil is effectively immediately de-energised when the slip-ring point of interruption, upon the precalculated cut-off r.p.m. being reached, interrupts the control circuit of the first transistor. Almost simultaneously with the de-energising of the additional clutch magnet coil, the brake magnet coil is energised. When the pertinent brush is in contact with the point of interruption of the slip-ring interrupter upon the precalculated cut-off r.p.m. being reached, then there follows consequently, in split seconds, first the de-energising of the additional clutch magnet coil and then the exciting of the brake magnet coil. Because of the quick response of the transistors, the point of interruption on the slip-ring interrupter, measured in the peripheral direction, can be maintained extremely small.

Therefore, the deviation of the actual angular stopping position from the precalculated stopping position, from the slip-ring interrupter, is kept within narrow limits. This alone would, to be sure, not suffice to keep the spread of the angular arresting positions small. On the contrary, care must be taken to see that, with the de-energising of the additional clutch coil, the exciting of the brake coil takes place, so that the component of the auxiliary drive cooperating with the clutch disc is braked after the disengaging of the source of torque. This is also achieved by the invention. Such a run-down of the arresting procedure is therefore necessary, in conjunction with the immediate braking, to keep the running-down coarse of the processing machine shaft always constantly small. For this purpose, besides the rapid braking after initiation of the arresting procedure, a reduction gear of high reduction of speed is placed into the gear pull of the component of the auxiliary drive cooperating with the clutch disc. By this means, one succeeds in bringing about the fact that the kinetic energy present in the processing machine dissipates itself virtually in this reduction gear when the source of torque of the auxiliary drive is cut off. For this reason, care must be taken to see that the kinetic energy has not already dissipated itself when the component of the auxiliary drive cooperating with the clutch disc is braked. Since, however, the kinetic energy of the processing machine shaft is virtually dissipated in the reduction gear, more especially if this latter is provided with a self-locking worm, an almost constant running-down course arises. In conjunction with the control in accordance with the invention, this results in the processing machine shaft coming to a rapid stop after the arresting procedure has been initiated, namely in an angular position which at most deviates one degree of angle from the desired precalculated stopping position.

The present invention will be described further with reference to one form thereof as illustrated in the accompanying drawings in which:

FIG. 1 is a part sectional elevation of a practical design of the drive; and

FIG. 2 is a diagram of the associated electrical circuit.

An electric motor 1 rotates a driven plate 2 to provide a high speed rotary main drive. When the motor 1 is switched on, the motor drives the driven plate 2 continuously. A clutch disc 3 is seated fast on a shaft 4 which also carries a belt pulley 5 which is movable longitudinally along and rotatable integrally with the shaft 4. The clutch disc 3 can be moved into engagement with the driven plate 2. A belt 6 drives a disc 8 from the belt pulley 5. The disc 8 is fixed on a shaft 7 of a processing machine, for example, a sewing machine.

The electric motor 1 also drives an auxiliary drive from take-off pulley 17, via a belt 16 to a rotary disc 15. The disc 15 has an electromagnet 14 embedded therein, which when energised attracts a clutch disc 13 into engagement with the disc 15. The clutch disc 13 is mounted on and rotates with a shaft 12 which carries a worm 11. The worm 11 cooperates with a worm wheel 10 which is fixed to a disc 9. The worm wheel 10 and disc 9 are freely mounted on the shaft 4 so as to be rotatable therearound.

Associated with the clutch disc 13, and located on the other side thereof to the disc 15, is a static brake 19. The brake 19 has an electromagnet 20 embedded therein, and when this magnet 20 is energised, the clutch disc 13 is held against the brake 19 thus preventing rotation of the shaft 12 and hence the disc 9.

A pedal 21 is provided, and when this is shifted in the direction of arrow A in the drawing, the clutch disc 3 is shifted to the left as shown on the drawing to come into engagement with the driven plate 2 and is entrained thereby. This is achieved by the pedal 21 being connected by a chain 22 to a lever 24 which pivots at 23 and is connected to the shaft 4 so as to move the shaft 4 and clutch disc 3. Moving the pedal 21 in the direction of the arrow A pulls the chain 22 down and with it that end of the level 24, which rotates in an anticlockwise direction as seen in the drawing, causing the clutch disc 3 and shaft to be moved to the left, connecting the machine shaft 7 to the high speed main drive which rotates at say 6000 revolutions per minute.

When the pedal 21 is released, it returns under action of a spring (not shown) to the position depicted in the drawing. The level 24 is released from tension and the shaft 4 and clutch disc 3 are returned by spring action to the portion shown in the drawing, with the clutch disc 3 in engagement with the disc 9.

If the magnet 14 is energised, the clutch disc 13 is drawn into engagement with the disc 15, thus driving the shaft 12 from the auxiliary drive. The rotation is transmitted via the disc 9, clutch disc 3 and belt pulley 5 to the machine shaft 7 which now rotates at a speed of say 300 revolutions per minute.

If the magnet 14 is then de-energised and the magnet 20 in the brake 19 is energised, the clutch disc 13 is brought against the brake 19. The shaft 12 and hence disc 9, clutch disc 3, shaft 4, pulley 5 and machine shaft 7 cease rotating.

An electronic switching circuit is provided for the alternate energising and de-energising of the magnets 14 and 20, and this is illustrated in FIG. 2.

On the shaft 7 is a slip-ring interrupter 25. The slip-ring interrupter 25 comprises three slip-rings 26, 27 and 28, having insulated points of interruption 29 and 30 on the rings 26 and 28 respectively. The rings are conductively connected to one another. Bushes 31, 32 and 33 ride on the slip-rings. The points of interruption 29 and 30 are diametrically opposed in relation to shaft 7. The brushes 31 and 33 are each connected to contacts of a selector switch 49, which enables a choice to be made between angular positions in which the drive may be stopped corresponding to the points of interruption 29 and 30.

The slip-ring interrupter 25, the selector switch 49 and the magnets 14 and 20 are electrically connected to a control circuit by plugged cables shown in FIG. 1, the circuit housing being shown diagrammatically as a housing on the motor 1. The real circuit is shown in FIG. 2 together with the parts 25, 49, 14 and 20.

Referring now to FIG. 2, the power supply to the magnet 14 and to the brake magnet 20 is controlled by a first switching transistor 34 and a second switching transistor 35. For the control of the transistor 34, lying in this latter's base control circuit parallel to the voltage divider formed by resistor 36 and 37 is a capacitor 38, which on the one hand is connected to the one pole of a Grätz bridge rectifier and on the other hand is connected to the brush 32. By means of the switch 40 or 41, this brush can, moreover, also be connected to the other pole of the bridge rectifier by way of resistor 39. Connected in series with the voltage divider consisting of resistors 36 and 37 is a potentiometer 42. A break-down diode 43 is connected in parallel with the voltage divider. Connected in parallel with the magnet 14 is rectifier 44 acting as a by-pass anode, and, in a similar way, connected in parallel with the winding 15 is rectifier 45, likewise acting as a by-pass anode. The base of the transistor 35 is connected to the voltage divider consisting of resistors 46, 47 connected between one pole of the bridge rectifier and, through the magnet 14, the other pole of the bridge rectifier.

So that, after the first transistor 34 has been blocked, this latter cannot again conduct when the insulated point of the synchroniser clears the brush, connected in series to the synchroniser is a further transistor 48 controlled in dependence on the second transistor 35.

When the first transistor 34 is conductive, the second transistor 35 is blocked and the third transistor 48 is conductive. If the second transistor 35 conducts then the third transistor 48 blocks and prevents the transitsor 34 from conducting when the brush is in contact with the conductive part of the synchroniser.

The presence in the circuit of the throw-over switch 49 makes it possible for the operator to alter the stopping position of the sewing needle after the switch 40 has been opened. If, upon the switch 40 being opened, provision was for example made for the sewing machine to come to a stop when the sewing needle is lowered, then the operator can, by throwing the switch 49, select for the machine to be stopped when the needle is raised. The throw-over switch 49 also allows the machine to be arrested temporarily.

When the pedal 21 is swung in the sense of the arrow A, then not only is the clutch disc 3 connected to the driven plate 2, but the switch 40 is also closed by the angle lever 24. The switch 41 is normally open. Conditional on the closing of the switch 40, the transistor 34 conducts, so that the magnet 14 is energised. The transistor 35 is blocked. The disc 9 is driven at a low rate of revolution. If the pedal 21 is now released, whereby the clutch disc 3 comes to rest against the disc 9, the switch 40 is also opened. In the depicted switch position of the switch 49, the transistor 34 now receives its control voltage from the brushes 32 and 33 via the slip-ring interrupter. Upon the respective interruption of the control circuit by the point of interruption 30, the capacitor 38 discharges, which, to begin with, causes the transistor 34 to remain conductive. The transistor 48 is also conductive. When the rate of revolutions of the slip-ring interrupter 25 has fallen to the precalculated cut-off r.p.m., that is to say, when the discharge current of the capacitor 38 is no longer capable of supplying the control circuit with current during the whole time that the control circuit is interrupted by the point of interruption 30, the transistor 34 blocks. The transistor 48 also blocks. The energy still present in the magnet 14 can dissipate itself via the rectifier 44 acting as a by-pass anode. The voltage at point P rises, so that the transistor 35 now becomes conductive. Consequently, magnet 20 is energised. This causes the disc 13 to be braked on the brake 19.

The point of interruption 30 and also the point of interruption 29 are kept comparatively small, taking in at the most an arc which corresponds to several degrees of angle. As soon as the point of interruption 30 contacts the brush 33 when the precalculated cut-off r.p.m. is reached, the shaft 7 is arrested almost instantaneously. By suitable angular arrangement of the brushes, not only can the rate of revolutions, at which stoppage takes place, thus be determined, but the angular stopping position can be fixed. In the example shown, provision is made to mount the brushes stationarily and to be able to select at will, by the switch 49, two diametrically opposite angular stopping positions. When the switch 49 is thrown over, the transistor 48 becomes conductive as a result of the discharging current of the capacitor 50 or 50′.

The break-down anode 43 serves to stabilise the voltage at the voltage divider of the transistor 34. For the dynamic stabilising, the emitters of both transistors are connected to the same pole of the bridge rectifier via a common resistor 51.

We claim:
1. In an electromotive drive unit which can be stopped in a pre-determined angular position and which comprises a high-speed main drive, a low-speed auxiliary drive, a clutch disc, an output drive shaft in driving connection with the clutch disc, means for operatively connecting the clutch disc selectively with the main drive and the auxiliary drive, an electromagnetic clutch for transmitting drive via the auxiliary drive to the output shaft, an electro-magnetic brake for braking the output drive shaft, an interrupter operatively connected to respond to the speed of rotation of the output drive shaft, and a capacitor electrically connected with said interrupter to gauge the speed of rotation of the output drive shaft and at a predetermined speed to brake said shaft, the improvement comprising, a transistor flip-flop circuit having a first transistor connected in a series with said electromagnetic clutch and a second transistor connected in series with said electromagnetic brake, a break-down diode and a voltage divider connected in parallel with said capacitor, the center-top of said voltage divider being connected to said first transistor to control flow of current therethrough, a third transistor connected in series with said interrupter and said capacitor-break-down diode-voltage divider unit connected to an element of the circuit of said second transistor for control of current flow in said third transistor wherein said capacitor is charged in response to the closing of a first switch which serially connects the capacitor to a power source and is discharged by the action of the interrupter when the speed of the output shaft falls below a predetermined value whereupon said first transistor is blocked, said flip-flop circuit turns over forward biassing of said second transistor and said third transistor is thereby blocked preventing re-charging of said capacitor and re-ignition of said first transistor.

2. An electromotive drive unit according to claim 1 and which can be selectively stopped in two angular stopping positions, said drive unit further comprising a throw-over switch, two interrupter means in said interrupter connected serially to poles of said throw-over switch which is connected to said third transistor, two charging capacitors also connected to the said third transistor and to a direct voltage power source to forward bias said third transistor when charging up, said capacitors being connected to poles of the throw-over switch to provide connection of the third transistor to said power sources selectively through a selected one of said charging capacitors.

References Cited
UNITED STATES PATENTS

| | | | |
|---|---|---|---|
| 2,734,340 | 2/1956 | Wood. | |
| 3,019,870 | 2/1962 | Even-Tov | 192—18 |
| 3,160,128 | 12/1964 | Heidt | 192—18.2 |
| 3,174,450 | 3/1965 | Becker | 192—18.2 |

CARLTON R. CROYLE, *Primary Examiner.*

MARK NEWMAN, *Examiner.*

C. M. LEEDOM, *Assistant Examiner.*